Dec. 12, 1961 R. C. P. HINTON ET AL 3,013,253

RECORDING SYSTEM

Filed July 19, 1956 4 Sheets-Sheet 1

INVENTORS
RAYMOND C. P. HINTON
BORIS DZULA
ALFRED L. M. FETTWEIS
BY [signature]
ATTORNEY Dec. 12, 1961 R. C. P. HINTON ET AL 3,013,253

RECORDING SYSTEM

Filed July 19, 1956 4 Sheets-Sheet 2

INVENTORS
RAYMOND C.P. HINTON
BORIS DZULA
ALFRED L. M. FETTWEIS
BY
ATTORNEY

INVENTORS
RAYMOND C.P. HINTON
BORIS DZULA
ALFRED L.M. FETTWEIS
BY
ATTORNEY

INVENTORS
RAYMOND C.P. HINTON
BORIS DZULA
ALFRED L.M. FETTWEIS
BY Percy P. Lantzy
ATTORNEY United States Patent Office 3,013,253

Patented Dec. 12, 1961

3,013,253

RECORDING SYSTEM

Raymond C. P. Hinton, Teaneck, Boris Dzula, Clifton, and Alfred L. M. Fettweis, Nutley, N.J., assignors to International Telephone and Telegraph Corporation, Nutley, N.J., a corporation of Maryland Filed July 19, 1956, Ser. No. 598,961

10 Claims. (Cl. 340—174.1)

This invention relates to memory or signal recording systems and more particularly to the synchronizing portion of such systems.

In memory or signal recording systems heretofore known some form of storage device is commonly employed together with recording and reading circuitry for which synchronizing control is required. In such systems employing magnetic drums, for example, the drum is provided with two signal tracks for synchronizing purposes, one to establish the necessary increment timing during a given cycle of operation and the other to establish a reset or realignment of associated equipment, such as counters, at the end or beginning of such cyclic operation. Since the provision of two tracks for this purpose requires recording space, which is usually at a premium, together with an additional reading head and associated detector, pulse forming and amplifier equipment, it is one of the objects of this invention to eliminate one of these tracks and thereby reduce to a minimum the track space and additional equipment required for synchronization.

Another object of the invention is to provide a synchronizing circuit for use with a single signal or clock track to provide increment and other synchronizing signals throughout a given cycle of operation and to also provide a reset realignment signal at the end of each such cycle.

Still another object is to provide in conjunction with a memory device having a plurality of tracks each including a given number of serially arranged recording cells and a single clock track, a synchronizing circuit having two or more counters responsive to clock track signals to provide increment and other synchronizing signals for use in associated equipment together with means for checking the counters periodically for realignment should any one counter deviate from true synchronization.

One of the features of this invention is to provide the single clock track of the recording medium with a series of first signals of one characteristic representing increments of time and at least a second signal of a different characteristic which marks the end of a cycle of operation and which may be used for resetting or realignment operation. Associated with the recording medium is a detector which detects these first signals as well as said second signal together with counters or other pulse generating means controlled by said first signals to provide synchronizing pulses corresponding to predetermined time intervals in each cycle of operation and means in response to detection of said second signal to effect a resetting or realignment of the counters controlled by said first signals. Since the counters require pulses for each increment of time on said track, means are provided to create timing pulses, one for each increment of time throughout the cycle of operation, to control operation of the counters. In one phase of the system a free-running multivibrator circuit is employed which normally operates slightly slower than the timing of the first signals so that the first signals are utilized to speed up a multivibrator to provide the necessary increment timing signals. Thus, where the second or reset signal replaces a first pulse signal, the multivibrator nevertheless operates to produce the necessary timing pulse in substantially the correct timing. In conjunction with this control feature it is sometimes desirable to eliminate the timing pulse during the occurence of said second or reset pulse, and this may be done by mixing the reset pulse with the timing pulses in inverted relationship. Examples of memory and recording devices to which this invention is applicable include telephone message recorders, computers, automatic registering systems, automation control, and telegraphy recorders.

The above-mentioned and other features and objects of this invention and the manner of attaining them will become more apparent by reference to the following description taken in conjunction with the accompanying drawings, wherein:

FIG. 4 shows the manner in which FIGS. 1, 2 and 3 are arranged one with respect to the other; and FIG. 5 is a graph of curves useful in explaining the invention.

Figure 1:
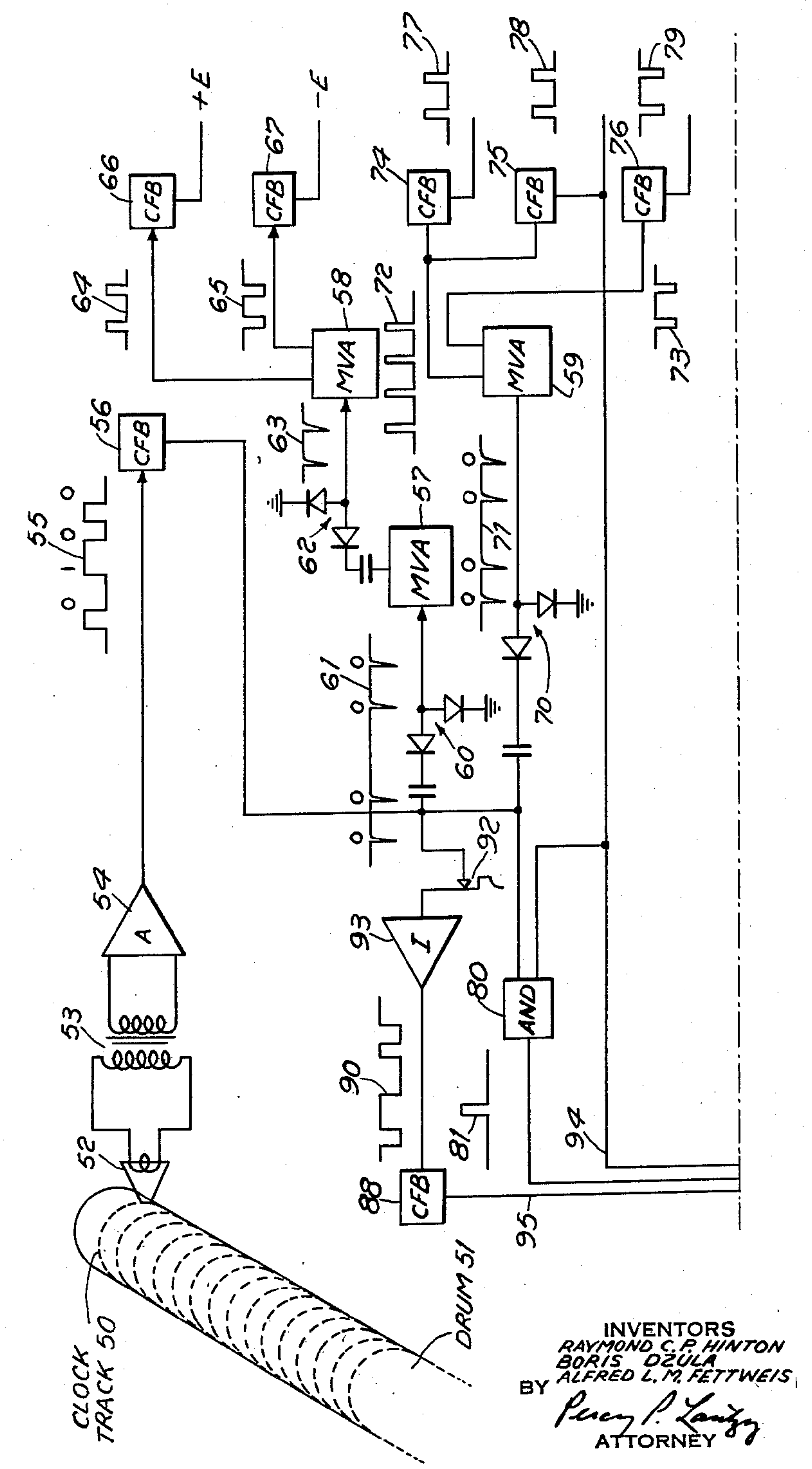
FIG. 1 is a schematic circuit diagram which provides the initial portion of the time scale.

Circuit components of construction known in the art have been depicted in block schematic form to simplify both the drawings and the description. These components include cathode followers, ring counters, multivibrators, and gate circuits.

The cathode followers are identified as CF with an additional letter designating the particular type. The CFA include a tube such 12AT7 having direct-current inputs. The CFB and CFC cathode followers are the same as CFA but with alternating-current inputs clamped to ground and battery, respectively.

The inverters are of the two types identified on the drawings as 1 and 1A. Inverter 1 may advantageously be conventional single-triode inverter normally biased to cutoff and with the input coupled through a capacitor. Inverters 1A may advantageously be a tube such pentode 6AS6 with a direct-current coupled input.

The multivibrators are of two types, astable or monostable, identified in the drawings as MVA and MVM. In the drawings, the plate output leads are depicted as emanating only from the top of the block schematic while the tripping and resetting are applied to the sides. The monopulser is a single stability twin-triode circuit in which a pulse extinguishes the conduction in the conducting triode and causes conduction to occur in the normally nonconducting triode for some period of time, determined by the constant of the monopulser circuit, after which time the monopulser will automatically reset itself to its normal state.

The astable or free-running multivibrators may advantageously include twin-pentode tubes 6AU6 provided with plate-catching diodes which effect a decrease in the recovery time. These multivibrators generate a continuous stream of pulses, with one part of the cycle shorter than the other or symmetrical as determined by the constant of the multivibrator. The free-running speed is slightly slower than the incoming pulses which synchronize the multivibrator to a higher speed.

The ring counters are of two types; the first comprises a number of single-component stages each of which is capable of assuming one of two conditions, off or on. This type may advantageously include cold-cathode gas tubes G1/371K as counting elements. Each element is shown as a separate rectangle with an input and an output. The cathodes are provided with integrating circuits to increase the rise time but not the decay time.

The second type may advantageously include 10-point conventional cold-cathode gas transfer tubes. These counters are shown as a series of rectangles side by side with an end input and an output for each stage. The counters all count to the end of their cycle and reset during ordinary operation. Each appearance of a signal on the stepping input causes a change from one stable state to the next in the direction of the arrowhead on the input.

The gate circuits comprise AND and OR gates which may include diodes connected together so as to allow passage of a potential only when this potential appears on all the input leads or when the potential appears on any one input lead, as is known in the art.

Referring to FIG. 1, a magnetic drum 51 is indicated on which a clock track 50 is recorded. This magnetic drum is of the type adapted to receive recordings on several tracks and for reading heads to pick off the recordings as required. This type and the associated counters are here illustrated by way of example, comprising the memory device and synchronizing portions of an automatic telephone message recorder. The signal produced from this track is detected by recording head 52 and transmitted through transformer 53 to amplifier 54. The amplified clock-track signal 55 is passed by cathode follower 56 and distributed through differentiating networks 60 and 70 to pulse formers 57, 58 and 59. The output is passed by cathode followers 66, 67, 74, 75, 76 and distributed as required throughout the system. The amplified clock-track signal and the output 78 is gated at 80 to provide a reset pulse for a purpose which will be described hereafter.

Figure 2:
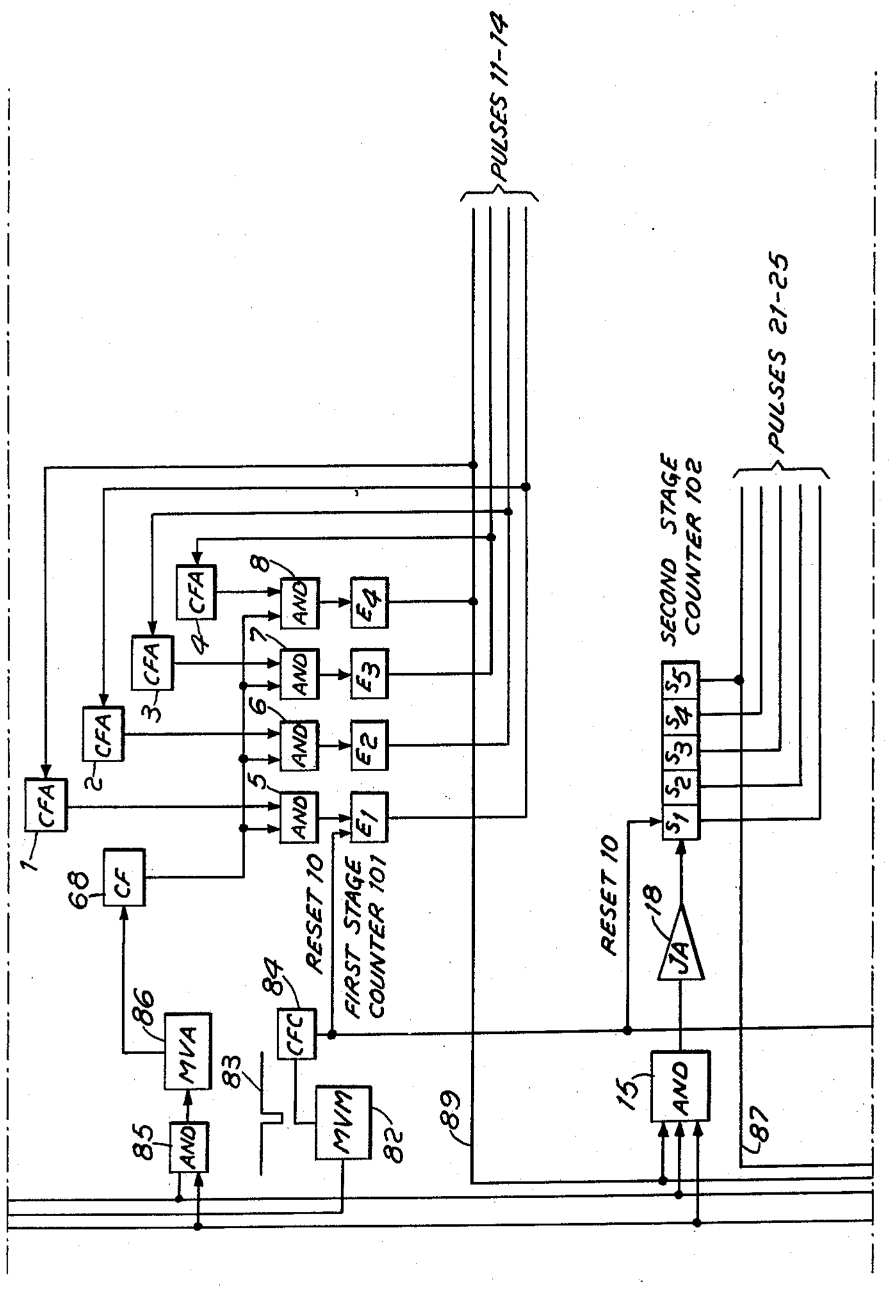
FIG. 2 is a schematic circuit diagram of the first and second stage counters.

Referring to FIG. 2, two stages of ring counters 101 and 102 are illustrated. The first stage 101 comprises four counting elements E1, E2, E3 and E4. Each cathode is coupled to the succeeding element via cathode followers CFA 1–4 and gates 5–8. Drive pulses are supplied from the coincident gate 85 through multivibrator 86, cathode follower 68 and applied to all the gates 5–88. A pulse is transmitted via any one of the gates 5 through 8 which has been conditioned by the preceding element, causing the counter to make one step. In this manner, the counter counts from one element to another. Each element supplies a pulse distributed via conductors 11–14 to associated equipment (not shown). For each revolution of the drum, a reset pulse 10 is applied to element E1 via multivibrator 82 and cathode follower 84, causing the counter to restore to the home position.

The second stage counter 102 is a multi-element cold-cathode gas transfer tube. The drive pulses are supplied via the coincident gate 15 and the inverter 18. The counter is restored to its home position by a reset pulse 10 applied to the first counting element. The outputs 21–25 of this counter is applied to associated equipment (not shown).

Figure 3:
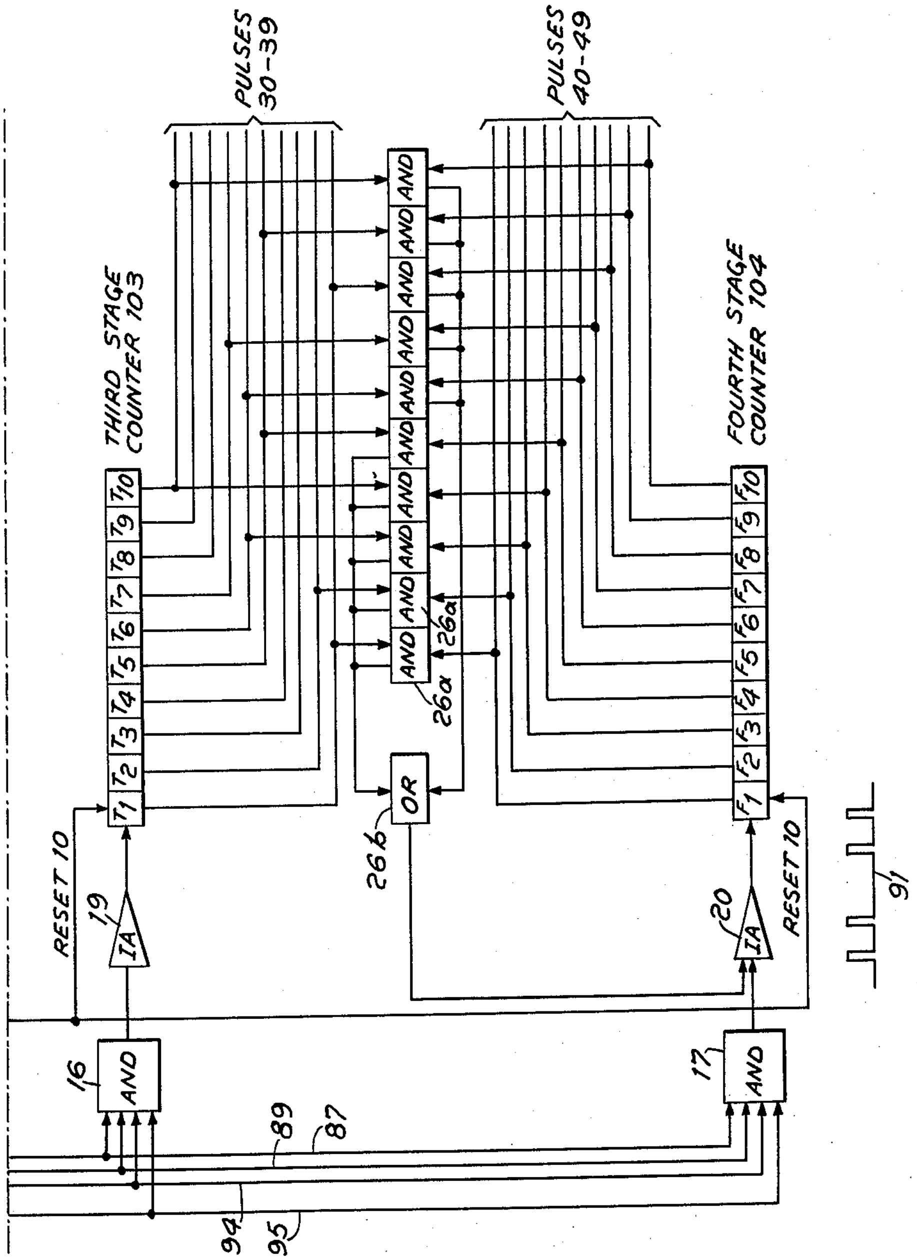
FIG. 3 is a schematic circuit diagram of the third and fourth stage counters.
Figure 4:
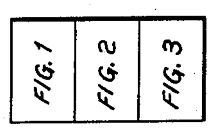
Figure 4:
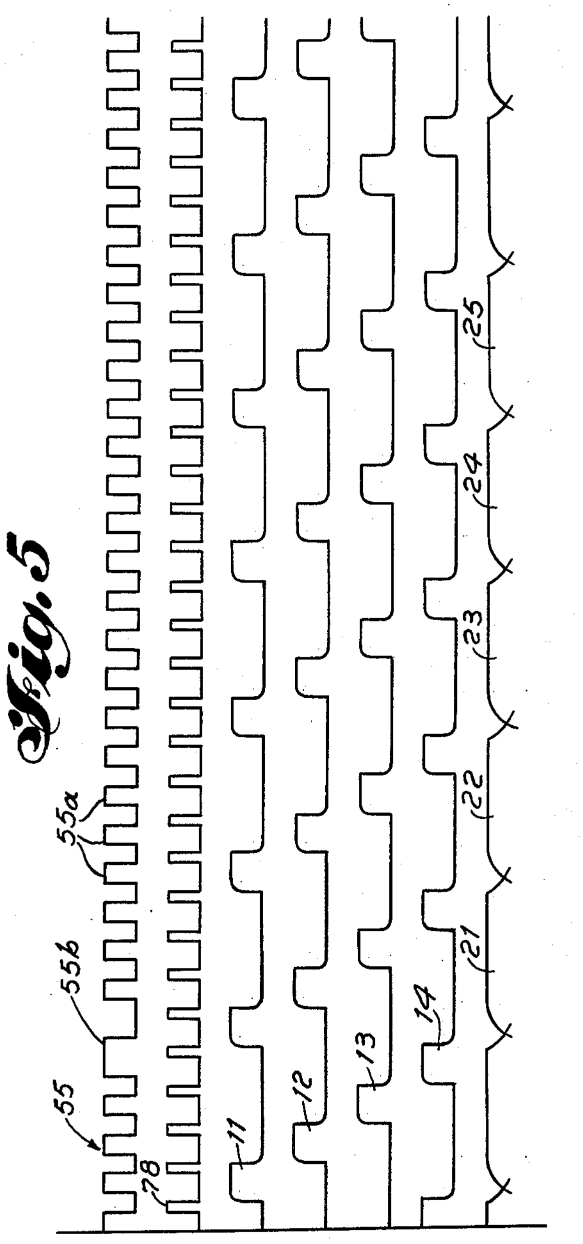

Referring to FIG. 3, the ring counters of the third and fourth stages 103 and 104 are shown. These counters are provided, respectively, with coincident gates 16, 17 and inverters 19 and 20 by which drive pulses are supplied. The drive circuit of the fourth stage is further controlled by gates **26*a* and 26*b* and inverter 20. The coincident gates 26*a* are coupled between the cathodes of counters 103, 104; and the outputs are applied to inverter 20 via gate 26*b*. By means of this arrangement, counter 104 will count only when there is a coincidence between the output of the third and fourth stages. For each revolution of the drum, a reset pulse 10 is applied to the first element of each counter, causing the counters to restore to their home position. The output of the counters is distributed via conductors 30–49** to associated equipment (not shown).

The time scale is covered by the four-stage 600-point counter system of FIGS. 1, 2 and 3, driven by phase-modulated pulses recorded on the clock track 50 of the magnetic drum 51. The recorded pulses comprise 599 negative signals and a single positive signal which indicates the home position of the drum and serves to synchronize the count of the time scale with the drum position.

In operation, the recorded signal is detected by the reading head 52, amplified and shaped, as indicated by the wave 55, the 599 negative pulses now appearing as pulses **55*a* and the single positive pulse appearing as pulse 55*b*. This wave is applied to pulse forming circuitry including multivibrators 57, 58, and 59, and also to the counter circuits 101, 102, 103 and 104. The amplified clock-track signal wave 55 is fed to multivibrator 57 through a differentiating network 60 which transmits only negative spikes 61. Multivibrator 57, which is of the free-running normally slower than the time scale of the wave 55, is kept in synchronism therewith by spikes 61. This arrangement reduces the effect of spurious pulses. The output is fed to multivibrator 58 through a differentiating network 62 which transmits the negative spikes 63 with half a period displacement as compared to waveform 61. The elements of multivibrator 58 have a different time constant producing the waveforms 64 and 65**. These signals are utilized for control purposes in associated equipment (not shown).

The clock-track signal wave 55, FIGS. 1 and 5, is also fed to multivibrator 59 through differentiating network 70 which transmits the negative spikes 71 thereby synchronising the free-running multivibrator 59. The output waveforms 72 and 73 provide a pulse for each cell of the clock track 50. These pulses are applied through cathode followers 74, 75, 76 and are designated master timing pulses 77, 78, and 79, respectively. Timing pulses 78 are also fed ot the coincident gate 80 and gated with the clock-track signal wave 55, thereby producing pulse 81. This single pulse per each revolution of the drum corresponds to the home position and is used to reset the counter system. The pulse is fed to the monostable multivibrator 82, which produces a negative pulse 83 which is fed to the first element of all counter stages, thereby resetting the counters.

Waveforms 78 and 90 (wave 55 inverted) are gated at the coincident gates 15, 16, 17, and 85. The gated output 91 of each of these gates provides pulses corresponding to all positions of the drum except for the home position. The purpose of this gating is to suppress the drive pulse during the occurrence of the reset pulse 81 thereby preventing interference between the drive and reset functions.

Waveforms 78 and 90 are applied to the coincident gate 85 via conductors 94 and 95. The gated output is fed into the astable multivibrator 86, having a free-running speed slightly slower than the incoming pulses. The output is fed to the coincident gates 5–8, causing the counter 101 to count from one element to another in a manner previously described, thereby providing output pulses 11–14 in the order indicated in FIG. 5.

The second stage counter 102 counts each cycle of the first counter. Drive pulses are supplied to the coincident gate 15, from element E4 of counter 101, via conductor 89. These pulses are gated with the pulses used for the preceding stage supplied by conductors 94 and 95. The output is fed to inverter 18 and applied to the counter, thereby providing a series of pulses 21–25 as indicated in FIG. 5.

The third stage counter 103 counts each cycle of the second stage 102. Drive pulses are supplied from element S5 of counter 102. These pulses are gated with pulses used in the preceding stage supplied via conductors 94, 87, 89, 95 and supplied to the coincident gate 16.

The fourth stage counter 104 counts one element after another under the control of the combined output of the third and fourth stage counters 103 and 104 as follows. Each cathode of the fourth stage is coupled to a corresponding coincident "AND" 26*a* gate which in turn is coupled to a cathode of the third counter 103. The output from these gates are taken via "OR" gate 26*b* and applied to the suppressor grid of inverter 20, which gates the drive pulses for the fourth stage counter. The drive pulses of the third stage counter 103 are also applied to the fourth stage. That is, pulses supplied via conductors 87, 89, 94 and 95 are also applied to the coincident gate 17. The output is taken via inverter 20 and applied to counter 104. This counter steps from the first element F1 in the following manner. The output from the first elements T1, S1 of counters 103 and 104, respectively, are taken via gates 26*a* and 26*b* to condition inverter 20. At the twentieth pulse from the drum, counter 101 has made five cycles, thereby causing counter 102 to count to the fifth element. Pulses are now supplied from elements E4, S5 over conductors 89 and 87 and applied to gates 16 and 17, together with pulses supplied via conductors 94 and 95. The output from gates 16 and 17 causes counters 103 and 104 to count to the second element. nI this manner the counters will count one element after another corresponding to clock pulses numbered 40, 120, 300, 320, 340, 420, and 500. These counter stages are provided with outputs 30–49 for use as required in the associated equipment.

If desired, the drive and reset pulses may be provided simultaneously by actuation of key 92 thereby disconnecting the inverted clock-track pulses 90 from gates 15, 16, 17, and 85. The waveform 78 supplies drive pulses for the counters in all positions of the magnetic drum. The circuit operation takes place as previously described, except that a drive pulse is supplied to all the counter stages simultaneously with the reset pulse.

The advantage of this arrangement is that the counters will be reset if they are in proper step, even though the reset pulse should be missing. The function of the reset pulse, of course, is to reset and thereby realign the counters should they be out of step with the magnetic drum.

While we have described above the principles of our invention in connection with specific apparatus, it is to be clearly understood that this description is made only by way of example and not as a limitation to the scope of our invention, as set forth in the objects thereof and in the accompanying claims.

We claim:

1. A synchronizing system comprising a memory device having a single clock track containing a series of first signals of one characteristic representing increments of time and at least one second signal of a different characteristic representing the timing of an operating cycle, means to detect said first and second signals, pulse generating means for producing synchronizing pulses timed in said cycle to correspond to different predetermined multiples of said increments, a pulse differentiator responsive to said first signals to produce timing signals for each increment of time throughout said operating cycle to control said pulse generating means, and means responsive to detection of said second signal to provide a signal for resetting at an identical position and at an identical time increment said pulse generating means once per each cycle of operation.

2. A synchronizing system according to claim 1, wherein the means for producing said timing signals includes a free-running multivibrator adapted normally to operate slightly slower than the timing of said first signals, means to apply said first signals to maintain the operation of said multivibrator in step with said first signals, inverter means to invert said first and second signals, coincidence means coupled to said inverter means, and means to apply the pulse output of said multivibrator to control said pulse generating means.

3. A synchronizing system according to claim 2, wherein the means for producing the signal for resetting said pulse generating means includes means for mixing the output of said multivibrator with said and second signals whereby said second signal passes the corresponding output pulse of said multivibrator.

4. A synchronizing system comprising a memory device having a single clock track containing a series of first signals of one characteristic representing increments of time and at least one second signal of a different characteristic representing the timing of an operating cycle, means to detect said first and second signals, including a free-running multivibrator, a pulse differentiating circuit connected thereto and a gate circuit controlled by the output of said multivibrator and said first signals counter means, means responsive to detection of said first signals to produce timing signals throughout said operating cycle to control said counter means, said counter means being arranged to provide, in response to said timing signals, synchronizing pulses timed to correspond to different predetermined multiples of said increments, and means responsive to detection of said second signal to provide a signal for resetting to an identical position at an identical time increment said counting means once per each cycle of operation.

5. A synchronizing system comprising a memory device having a single clock track containing a series of first signals of one characteristic representing increments of time and at least one second signal of a different characteristic representing the timing of an operating cycle, means to detect said first and second signals, a single gate controlled by said first signal, and a differentiated signal derived therefrom to provide a control pulse, a plurality of counters arranged to produce synchronizing pulses timed to correspond to different predetermined multiples of said increments, means responsive to said first signals to produce timing signals for each increment of time throughout said operating cycle to control said counters, and means responsive to said second signal to reset said counters at the end of each cycle of operation.

6. A synchronizing system according to claim 5, wherein the means for producing said timing signals includes a free-running multivibrator whose operation is controlled by said first signals, and wherein said counters each have associated therewith an input gate circuit, and means to apply to the gate circuits the output of said multivibrator.

7. A synchronizing system comprising a memory device having a single clock track containing a series of first signals of one characteristic representing increments of time and at least one second signal of a different characteristic representing the timing of an operating cycle, means to detect said first and second signals, counter a pulse differentiating circuit connected to said detecting means, a free-running multivibrator, means to apply said first signals to said multivibrator to produce timing signals for each increment of time throughout said operating cycle, an electronic gate, means to apply the detected first and second signals and said timing signals to said gate for passage of said timing signals to said counter means, said counter means being arranged to provide synchronizing pulses timed to correspond to different predetermined multiples of said increments, a second electronic gate, and means to apply to said second gate said track signals and said timing signals for passage only of the one timing signal that coincides with the said second signal of said clock track, and means to apply said one timing signal to said counter means for reset purposes at the end of each cycle of operation.

8. In a syncronizing system, a rotating drum having a clock track, means for generating from said clock track a train of rectangular repetitive pulses including a flag signal pulse interspersed therebetween, a free-running multivibrator connected to said generating means, a pulse differentiating circuit connected between said multivibrator and said generating means a single "AND" gate connected to said generating means, said "AND" gate being controlled by said pulse train and by the output of said multivibrator to provide a control pulse corresponding to said flag signal in the output of said "AND" gate.

9. In a synchronizing system, a rotating drum having a clock track, means for generating from said clock track a train of rectangular repetitive pulses including a flag signal pulse of greater width than said repetitive pulses and interspersed therebetween, a pair of parallel branching paths connected to said generating means, a free-running single multivibrator coupled to one path, a single "AND" gate connected to the second path and means coupling said free-running multivibrator to said gate, the output of said "AND" gate providing a control pulse corresponding to said flag signal.

10. In a synchronizing system, a rotating drum having a clock track, means for generating from said clock track a train of rectangular repetitive pulses including a flag signal pulse of greater width than said repetitive pulses and interspersed therebetween, a free-running multivibrator connected to said generating means, a pulse differentiator circuit connected between said generator and free-running multivibrator to provide trigger pulses corresponding to said generated pulses, a single "AND" gate connected to said generating means, said single "AND" gate being simultaneously controlled by said generator and by said multivibrator to provide a control pulse corresponding to said flag signal in the output of said "AND" gate.

References Cited in the file of this patent

UNITED STATES PATENTS

| | | |
|---|---|---|
| 2,807,003 | Aldrich | Sept. 17, 1957 |
| 2,864,078 | Seader | Dec. 9, 1958 |

OTHER REFERENCES

"A Magnetic Digital Storage System" (Booth) Electronic Engineering, July 1949, pp. 235–238.